United States Patent
Wilson

(10) Patent No.: US 9,285,077 B2
(45) Date of Patent: *Mar. 15, 2016

(54) HELICOPTER DRIP PAN

(71) Applicant: Phoenix Products Inc., McKee, KY (US)

(72) Inventor: Thomas Gray Wilson, McKee, KY (US)

(73) Assignee: Phoenix Products, Inc., McKee, KY (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/684,828

(22) Filed: Nov. 26, 2012

(65) Prior Publication Data

US 2014/0008484 A1    Jan. 9, 2014

Related U.S. Application Data

(60) Continuation of application No. 13/347,053, filed on Jan. 10, 2012, now Pat. No. 8,317,127, which is a division of application No. 12/330,348, filed on Dec. 8, 2008, now Pat. No. 8,096,496.

(60) Provisional application No. 61/014,960, filed on Dec. 19, 2007.

(51) Int. Cl.
*B64C 27/04* (2006.01)
*F16N 31/00* (2006.01)

(52) U.S. Cl.
CPC ......... *F16N 31/002* (2013.01); *Y10T 29/49826* (2015.01); *Y10T 29/49947* (2015.01)

(58) Field of Classification Search
USPC ........ 244/1 R, 129.1, 17.11, 135 R; 220/326, 220/806, 378; 184/106; 277/598
See application file for complete search history.

(56) References Cited

U.S. PATENT DOCUMENTS

| | | |
|---|---|---|
| 2,053,297 A | 9/1936 | Nittel |
| 2,383,200 A | 8/1945 | Kramer et al. |
| 2,475,836 A | 7/1949 | Henricksen et al. |
| 3,779,330 A | 12/1973 | Longpre |
| 3,971,511 A | 7/1976 | Casey |
| 4,394,853 A | 7/1983 | Lopez-Crevillen et al. |
| 4,682,672 A | 7/1987 | Berger et al. |
| 4,936,483 A | 6/1990 | Ballu |

(Continued)

OTHER PUBLICATIONS

International Search Report and Written Opinion in related International Application No. PCT/US2008/086807, mailed Apr. 14, 2009.

(Continued)

*Primary Examiner* — Benjamin P Lee
(74) *Attorney, Agent, or Firm* — Wood, Herron & Evans, LLP

(57) ABSTRACT

A drip pan apparatus for a "M" model BLACK HAWK® helicopter and the like includes an expanded corner structure for accommodating an access port also positioned further outwardly in the corner than in prior drip pan apparatuses, facilitating filter viewing while retaining peripheral o-ring seal. An expanded corner of the airframe skirt is accommodated by the expanded corresponding corner of a frame, which also defines a small radius internal curve. The removable pan has a small radius curve cooperating with the small radius curve of the frame and is sealed thereto by the peripheral o-ring seal sealing the entire pan to the frame. Physical access to the filter is enhanced.

26 Claims, 12 Drawing Sheets

(56) References Cited

U.S. PATENT DOCUMENTS

| | | |
|---|---|---|
| 5,018,407 A | 5/1991 | Hoecht |
| 5,411,116 A | 5/1995 | Kish et al. |
| 5,421,474 A | 6/1995 | Ramillon et al. |
| 5,531,196 A | 7/1996 | Clark |
| 5,544,632 A | 8/1996 | Choate |
| 6,112,856 A | 9/2000 | Wilson |
| 6,216,823 B1 | 4/2001 | Wilson |
| D444,443 S | 7/2001 | Wilson et al. |
| 6,446,907 B1 | 9/2002 | Wilson et al. |
| 6,729,576 B2 | 5/2004 | Kay et al. |
| 2006/0037427 A1 | 2/2006 | Holub |

OTHER PUBLICATIONS

Taiwanese Intellectual Property Office, Office Action in Taiwanese Patent Application No. 097149919, dated Jun. 13, 2012.

U.S Patent and Trademark Office, Office Action in U.S. Appl. No. 13/347,053, dated Feb. 16, 2012.

U.S. Patent and Trademark Office, Notice of Allowance in U.S. Appl. No. 13/347,053, dated Jul. 26, 2012.

European Patent Office, Decision to Grant in EP Patent Application No. 08866167.3, dated Jun. 21, 2012.

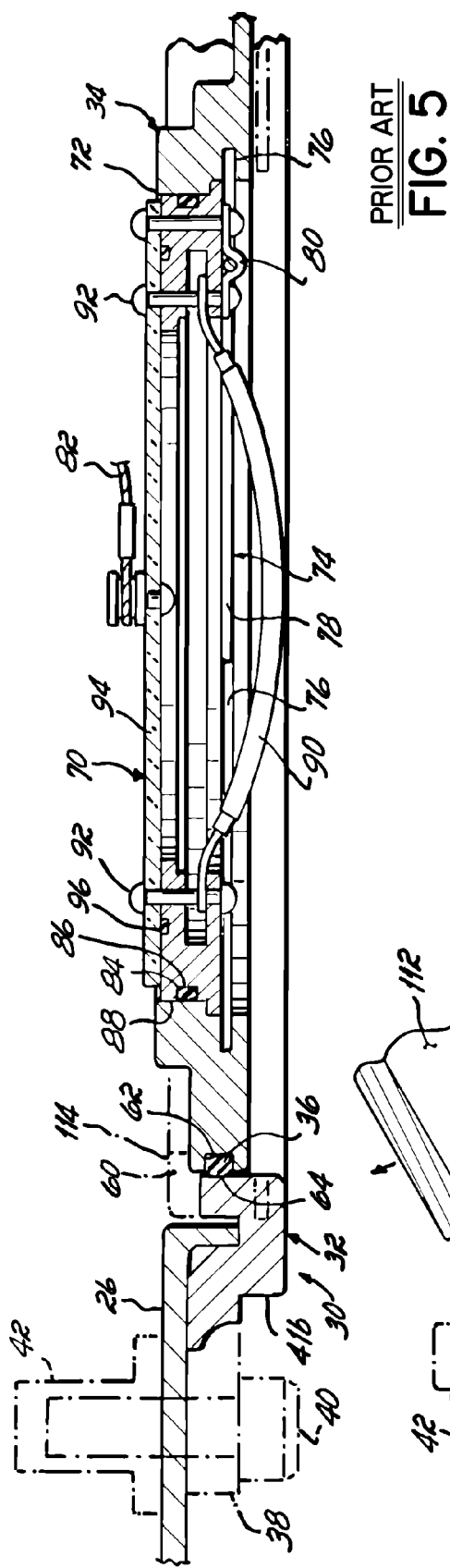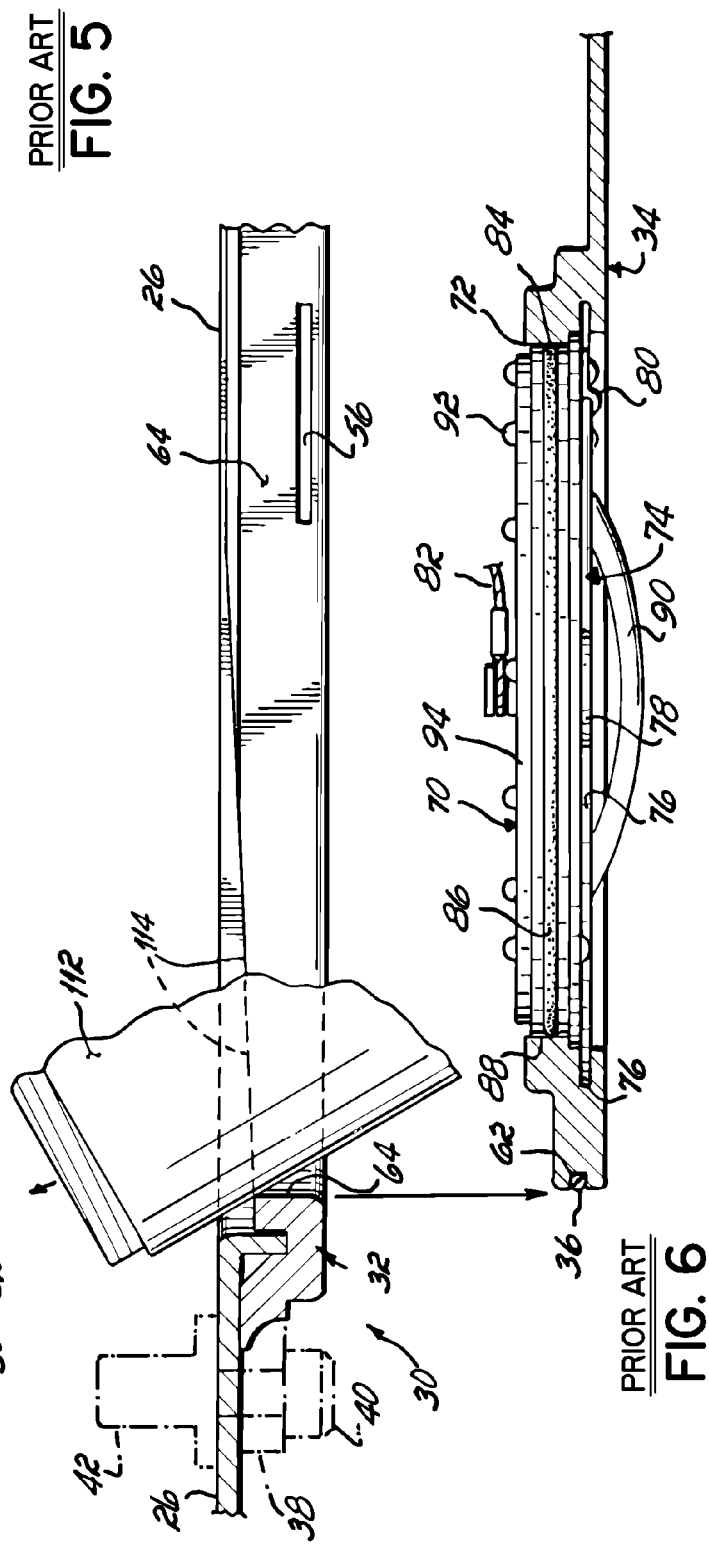
PRIOR ART FIG. 5
PRIOR ART FIG. 6

HELICOPTER DRIP PAN

CROSS-REFERENCE TO RELATED APPLICATIONS

This application is a continuation of U.S. Pat. No. 8,317,127, filed Jan. 10, 2012, which claims the benefit of and is a divisional application of U.S. Pat. No. 8,096,496, filed Dec. 8, 2008; and U.S. Provisional Patent Application Ser. No. 61/014,960, filed Dec. 19, 2007, the disclosures of each being incorporated by reference herein in their entirety.

FIELD OF THE INVENTION

This invention relates to a fluid-tight drip pan, and more specifically to a fluid-tight drip pan for the engine or transmission compartment of a helicopter.

BACKGROUND OF THE INVENTION

Larger helicopters, in general, have several features in common in a typical basic configuration or layout. For instance, a typical helicopter will have a cabin section rearward of the pilot's cockpit or flight deck and which is used to transport people, cargo or both. In addition, the helicopter will have an engine compartment which is located typically above and to the rear of the pilot's cockpit or flight deck, and above the cabin section. The engine compartment typically houses two primary components, at least one engine and a rotor transmission with a corresponding transmission housing.

Both the engine and the rotor transmission contain numerous fluids, such as petroleum-based lubricants, that are critical to the operation of the engine and the transmission. These fluids inevitably leak from various locations in the engine and the transmission during both the operation and storage of the helicopter. Because the engine compartment is generally oriented above the cabin section, any leaking fluids eventually seep or drip into the cabin section, unless proper sealing mechanisms are in place. The inflow of these leaking fluids spoil, stain or damage the cabin's interior materials such as seat covers and acoustic linings. In addition, the leaking fluids can severely damage or destroy sensitive electronic equipment that may be placed in the cabin section of a helicopter.

Moreover, the exterior of the helicopter around the engine and transmission compartment is not completely fluidtight, allowing fluid such as water to leak from these areas into the cabin with similar adverse effects.

During routine inspection and maintenance it is necessary to have both ready visual and physical access to portions of the engine or at least the rotor transmission. Such access is required to check critical fluid levels, to replace worn, damaged or depleted parts or filters, or to adjust mechanical systems. Typically, various access panels in or around the engine or transmission compartments provide the requisite openings to achieve ready access to the engine and the rotor transmission. In some helicopters, a forged or fixed airframe structure forms an access opening which is located below the rotor transmission housing and above the cabin section. The opening is thus accessible through the cabin's ceiling. This access opening, however, must be sealed by a cover against the inevitable oil and fluid drippings which the engine and the rotor transmission will produce, as well as against water leakage.

The access opening below the engine compartment in the prior helicopters, such as the BLACK HAWK® helicopter, made for the United States by Sikorsky Aircraft Company of Stratford, Conn., is defined by both the aircraft structural forgings and a flexible or yieldable downwardly-turned skirt which is riveted onto the helicopter's forged structure. The skirt is thin and many times more flexible relative to the helicopter's forged structure.

Prior drip pan designs attached a covering plate directly to the flexible skirt with a hollow seal sandwiched therebetween. One hollow seal used in prior designs resembled the flexible, hollow door seals used around car doors or refrigerator doors. However, the skirt contains surface aberrations, such as the protruding rivet heads from the rivets securing the skirt to the forged helicopter structure. When the seal engaged both the skirt and the rivet heads, it could be upset enough so that leakage occurred. Accordingly, the hollow seal traversing these aberrations while sandwiched between the skirt and the covering plate is unable to provide a suitable, consistent, long-term fluid seal. Moreover, flexing of the flexible skirt could also cause leakage.

Also, the geometry of the cover cannot be such that it protrudes significantly into the interior of the cabin section. Headroom in the cabin section typically is limited and any additional protrusion from the ceiling of the cabin section is undesirable. In addition, because weight is critical to the operation of any aircraft, heavy cover constructions are undesirable.

Other prior drip pan structures disclosed in U.S. Pat. Nos. 6,112,856; 6,216,823; 6,446,907 and Design Pat. No. D444,443, which are fully incorporated herein by this express reference, provided improvements and solutions to these difficulties. However, Sikorsky has now introduced its "M" Model BLACK HAWK® helicopter for which these prior structures are not readily adaptable due to a change in configuration of the skirt noted above.

In particular, while the prior drip pans provided a port for visual access to an oil filter, the port was offset from the filter, rendering it more difficult to see the filter from many viewing angles through the port, also requiring specially shaped tools to manipulate filter retention bolts and requiring tilting of filters when removed or replaced.

The "M" model is currently in the process of introduction by Sikorsky for use by U.S. Military. In that model, and in other aircraft with what are or will be similarly-shaped skirts, there is still a skirt as disclosed in the prior U.S. Pat. No. 6,446,907 with the exception that in the access area or corner for the filter, the corner of the skirt has been pulled outwardly to allow direct and straight-through access to the filter and its filter retention bolts where the pan is removed. Such direct access is preferable as it eliminates the need for the special dog-bone shaped tools necessary to operate the filter retention bolts to remove and install the filter as was required with the prior drip pan, which not only required such tools but also required the filter to be "tipped" as it was removed or replaced and before it could be seated (see FIG. 6 of U.S. Pat. No. 6,446,907). Accordingly, in the new "M" model, one corner of the old prior skirt has been pulled or extended outwardly and asymmetrically to the other corners.

Stated in another way, the radius point or center of the expanded corner curve of the skirt has been moved outwardly from its position in the prior drip pan and the straight sides of the skirt are no longer tangent to the curve of this corner.

Such modification of the skirt renders the prior symmetric frame and drip pan incompatible with the new "M" model air frame. There is or would be a gap between the new skirt at the expanded corner and the old drip pan and drip pan frame. Accordingly, there is no way for the old drip pan and frame structure of the prior patents, including U.S. Pat. No. 6,446, 907, to provide sealing for the new "opened" corner defined by the new skirt to allow more direct access to the filter.

In order to overcome this problem, the old frame and drip pan could be re-shaped to the new skirt shape, however, the requirement to seal the pan peripherally to the frame in such a case would require extensive and expensive re-working of the peripheral seal structure of the pan. In particular, the pan would require a special seal seat groove to be milled or otherwise manufactured into the edge of the pan.

Specifically, since the straight skirt sides extend in a direction intersecting with, and are no longer tangent to, the skirt curve at this corner, the skirt takes on inwardly-facing convex shapes, directed inwardly of the access opening, before flowing into the new expanded inwardly-facing concave corner. This skirt configuration would require a cooperative configuration of the drip pan whose cover would follow that of the skirt. When a drip pan for a corresponding frame is so shaped, the peripheral o-ring sealing the drip pan to the frame cannot be used as with the prior o-ring groove due to the changed configuration of the sealing surfaces. When stretched to fit, the o-ring on the drip pan would not follow this curved portion of the pan because it would span across the corresponding outwardly-facing concave drip pan curves. Thus, the fit of the o-ring would render installation of the pan to the frame problematical and adversely affect the desired seal.

In other words, the spanning o-ring would interfere with the corresponding inwardly-facing convex curve of the frame when the pan was inserted therein. This would, in turn, require the provision of a much more expensive and complicated o-ring retaining groove in the peripheral edge of the removable pan.

Moreover, the aforesaid problem of visual access to the filter through the corresponding site port has remained a problem. It is desired to enhance the location of the port to facilitate more visual access to the filter and to its "bypass button" from more viewing locations. The retention of the prior site port in its same position relative to the old drip pan, however, would retain the visual disadvantages mentioned.

Accordingly, it is one objective to provide an improved leak-proof drip pan apparatus for use in "M" model BLACK HAWK® helicopters.

A further objective of this invention is to provide an improved cover and seal for the interior access opening of helicopters such as the BLACK HAWK® "M" model helicopter and those of similar structure.

Another object of this invention is to provide a drip pan that will effectively and consistently seal fluid from passage from an engine or transmission compartment to a cabin section of a BLACK HAWK® "M" model helicopter and similar air frames.

Another object of this invention is to provide a drip pan which permits quick visual and physical access to the engine or transmission compartment of a BLACK HAWK® "M" model helicopters and similar helicopters without requiring modification to the existing aircraft structure.

Another objective of the invention is to more effectively seal a drip pan to the skirt defining a transmission access opening in a BLACK HAWK® "M" model helicopters and similar helicopters.

Still another object of this invention is to provide a drip pan that can be attached to the existing structure of a BLACK HAWK® "M" model helicopter and similar helicopters without modification of the existing airframe structure and with minimal intrusion into the helicopter's cabin section.

Another objective of the invention is to provide an improved drip pan for use with BLACK HAWK® "M" model helicopter and similar air frames using an o-ring seal between drip pan and frame, where all peripheral curves in the pan are convex (i.e., outwardly directed) with respect to the pan.

Yet another objective of the invention is to provide enhanced visual access to a filter in an "M" model BLACK HAWK® helicopter.

SUMMARY OF THE INVENTION

In other features and functions, the new helicopter drip pan apparatus herein covers and effectively seals a structural opening in the helicopter without leakage.

To these ends, in one embodiment, a drip pan is adapted to cooperate with a frame having an inwardly-facing peripheral surface. The frame is secured to a depending skirt which defines the structural access opening for access to a rotor transmission of a BLACK HAWK® Model "M" helicopter. The access opening also provides access to components, such as an oil filter, attached to the rotor transmission.

The drip pan comprises a member having an outwardly-facing peripheral surface. The outwardly-facing peripheral surface is adapted to cooperate with the inwardly-facing peripheral surface of the frame and defines a first pan corner and at least one other pan corner. The first pan corner differs in curvature from the other pan corner. In one embodiment, the member is removably received within the frame in a single orientation. In one embodiment, the first pan corner is defined by a first pan corner radius and the other pan corner is defined by a pan corner radius that is larger than the first pan corner radius.

In one embodiment, a helicopter has an access opening defined by a depending skirt having at least two straight sides connected by a corner. The corner is defined by an inwardly oriented concave curve such that an extension of the concave curve intersects an extension of at least one straight side at an angle greater than zero degrees. The drip pan apparatus comprises a drip pan and a frame. The frame is configured to cooperate with the skirt, including the inwardly oriented concave curve. The frame comprises an inwardly-facing first frame corner defined by a first frame corner radius, and at least one other inwardly-facing frame corner defined by a frame corner radius that is greater than the first frame corner radius. The drip pan cooperates with the frame and comprises a first pan corner defined by a first pan corner radius that is configured to cooperate with the first frame corner, and at least one other corner defined by a pan corner radius that is greater than the first pan corner radius. The at least one other pan corner is configured to cooperate with the at least one other inwardly-facing frame corner.

In one embodiment, a drip pan apparatus for covering and sealing the helicopter transmission access opening in a helicopter comprises a drip pan and a frame adapted to mount to the helicopter transmission access opening. The frame has an inwardly-facing peripheral surface extending around the frame. The inwardly-facing peripheral surface has a first frame corner defined by a first frame corner shape and at least one other frame corner defined by a frame corner shape that differs from said first frame corner shape. The drip pan has an outwardly-facing peripheral surface extending around the drip pan. The outwardly-facing peripheral surface has a first pan corner defined by a first pan corner shape and at least one other drip pan corner defined by a drip pan corner shape that differs from the first pan corner shape. The first pan corner cooperates with the first frame corner and the drip pan is configured to be selectively affixed to the frame. A seal member is operably disposed between the outwardly-facing peripheral surface and the inwardly-facing peripheral surface when said drip pan is affixed to the frame.

In one embodiment, a drip pan is configured to cooperate with a frame secured to a depending skirt, which defines an access opening for access to a rotor transmission of a helicopter. The frame has an inwardly-facing peripheral surface of asymmetrical shape. The drip pan comprises a member having an outwardly-facing peripheral surface of asymmetrical shape operably corresponding to the asymmetrical shape of the inwardly-facing peripheral surface of the frame. A resilient seal is disposed between the inwardly-facing peripheral surface and the outwardly-facing peripheral surface when the member is operably disposed in the frame for sealing the member to the frame, about the peripheral surfaces.

In one embodiment, a drip pan apparatus for a rotor transmission access opening in a helicopter comprises a drip pan having a peripheral edge for fitting in the opening. The edge is defined in part by a plurality of corners, one of which is developed about a radius of smaller extent than the radii of the other corners in the plurality.

This configuration is attained despite and contrary to the previously conventional wisdom than an o-ring seal could not be used effectively about and around the relatively small radius of the pan corner. According to conventional wisdom, placing the o-ring seal about such a small radius would result in undue stretch of the o-ring. The belief was that the resulting reduction in diameter of the o-ring would, in turn, result in seal efficiency derogation or other seal failure. Contrary to this belief, embodiments of the pan apparatus do not result in a stretched o-ring and, furthermore, do not require the o-ring to fit into any concave areas extending into the pan to avoid an otherwise interference fit between the o-ring and frame upon pan insertion.

These and other objectives and advantages will become readily apparent from the following description of embodiments of the invention and from the drawings in which:

BRIEF DESCRIPTION OF THE DRAWINGS

FIGS. 1-6 are reproduced herein from the prior U.S. Pat. No. 6,446,907 for clarity of contrast to the present invention and are described in that patent;

PRIOR ART

Applicant first describes the prior art as in U.S. Pat. No. 6,446,907 for purposes of environment background and contrast with the invention. Item numbers shown in FIGS. 2-6 when used on FIGS. 7-12 designate components in FIGS. 7-12 which are similar or identical to components in FIGS. 2-6.

Figure 1:
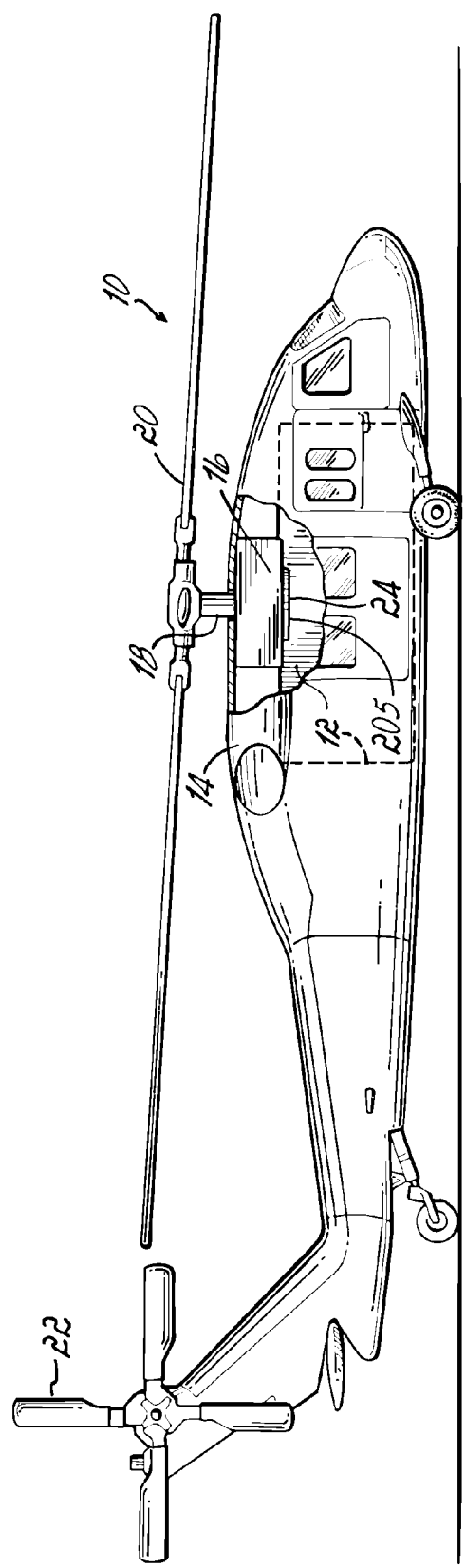

FIG. 1 shows a widely known configuration of a typical helicopter 10. While the typical helicopter 10, for example, in this prior description was a BLACK HAWK® helicopter as manufactured for the United States by Sikorsky Aircraft Company, Stratford, Conn., it will be appreciated that the drip pan structure described in the prior patents was useful in numerous aircraft and helicopter configurations of other prior makes and models. In this configuration the helicopter 10 had a cabin 12 (dashed outline) in which passengers, equipment and cargo could ride during operation. Located just above the cabin 12 was at least one engine 14 which supplied power to a rotor transmission 16. The rotor transmission 16 was connected to a shaft 18 which imparted rotary motion to the main rotor 20. The rotor transmission 16 was also connected via a drive shaft (not shown) to a tail rotor 22.

The rotor transmission 16 required frequent inspection and maintenance to ensure proper operation of the transmission. To facilitate easy and ready access to the rotor transmission, rotor transmission access openings were provided on both the exterior and interior of the helicopter. For example, structural opening 24 was located within the cabin 12, providing the requisite access to the rotor transmission 16 situated directly above the cabin 12. Structural opening 24 generally had some type of removable covering to seal the transmission area 16 from the cabin area 12. To accommodate attachment of a removable covering, a flexible skirt 26 (FIG. 2) was fixedly secured around the periphery of structural opening 24 by rivets 28. Skirt 26 was many times more flexible than the structural opening 24 to which it attached.

Figure 2:
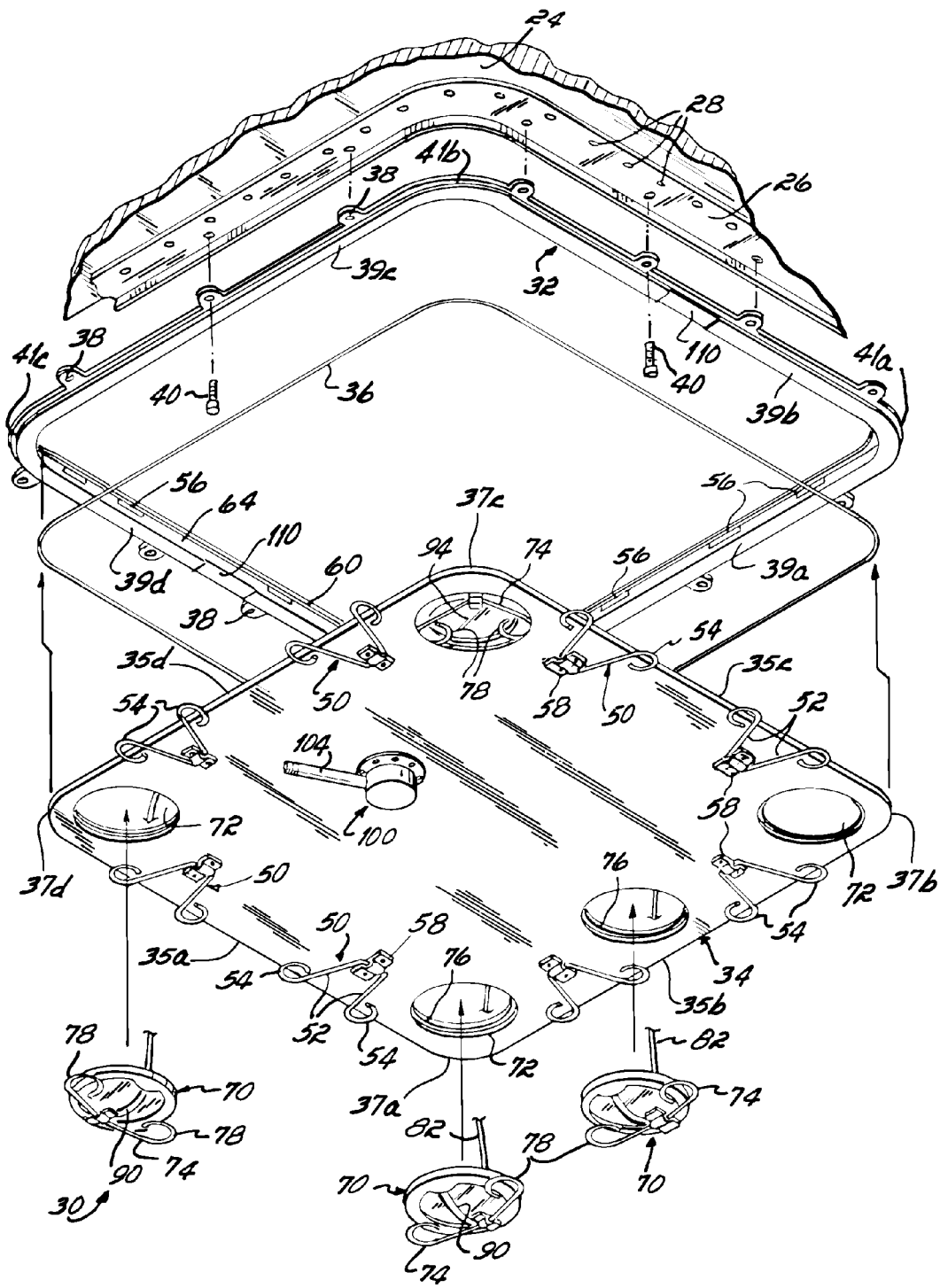

As can be further appreciated the rotor transmission 16 as well as the engine 14 required various fluids during their respective operations. Generally, these fluids provided the rotor transmission 16 and the engine 14 with lubrication, cooling, and the like. During operation these fluids may leak and drip from either the engine 14 or rotor transmission 16 or both. To prevent leakage of fluid into the cabin 12 via structural opening 24, a drip pan apparatus 30, as shown in FIG. 2, was used to cover and seal the structural opening 24.

With specific reference to FIGS. 2-6, the drip pan apparatus 30 according to one preferred embodiment of the prior structure had a frame member 32, a drip pan 34, and a seal member 36 cooperating together to provide a fluid tight sealing arrangement for structural opening 24. Frame member 32 had a plurality of lugs 38 disposed about the exterior periphery of frame member 32. Four lugs 38 were disposed on two sides of the frame member 32 and three lugs 38 were disposed on the other two sides of the frame member 32. Fasteners 40 cooperated with lugs 38 and threaded retention members 42 (FIG. 4) to secure frame member 32 to skirt 26 attached to structural opening 24. Once installed, frame member 32 typically remained in place and was not routinely removed from structural opening 24, although it could be readily removed by simply extracting fasteners 40. Frame member 32 was many times more rigid than the flexible skirt 26.

Drip pan 34 had a plurality of resilient members 50 which serve to hold drip pan 34 in sealing engagement with frame member 32. Each resilient member 50 had elongated arms 52 with curved portions 54. Resilient members 50 were free to pivot about brackets 58. Curved portions 54 selectively engaged slots 56 opening toward and located about the interior periphery of frame member 32. To secure drip pan 34 to frame member 32, the drip pan 34 was pushed into the interior of frame member 32 until the drip pan 34 contacted lip 60

(FIG. 4) which extended around frame member 32 and acted as a stop for drip pan 34. Only part of the curved portions 54 were resiliently inserted into slots 56. The installation and the removal of the drip pan 34 was accomplished rather quickly using the resilient members 50 because no tools such as screwdrivers or wrenches were required. Equally important, resilient members 50 were permanently secured to the drip pan 34 by brackets 58, so the resilient members 50 could not be lost or misplaced when the drip pan 34 was removed to gain full access to the engine 14 and rotor transmission 16.

Figure 3:
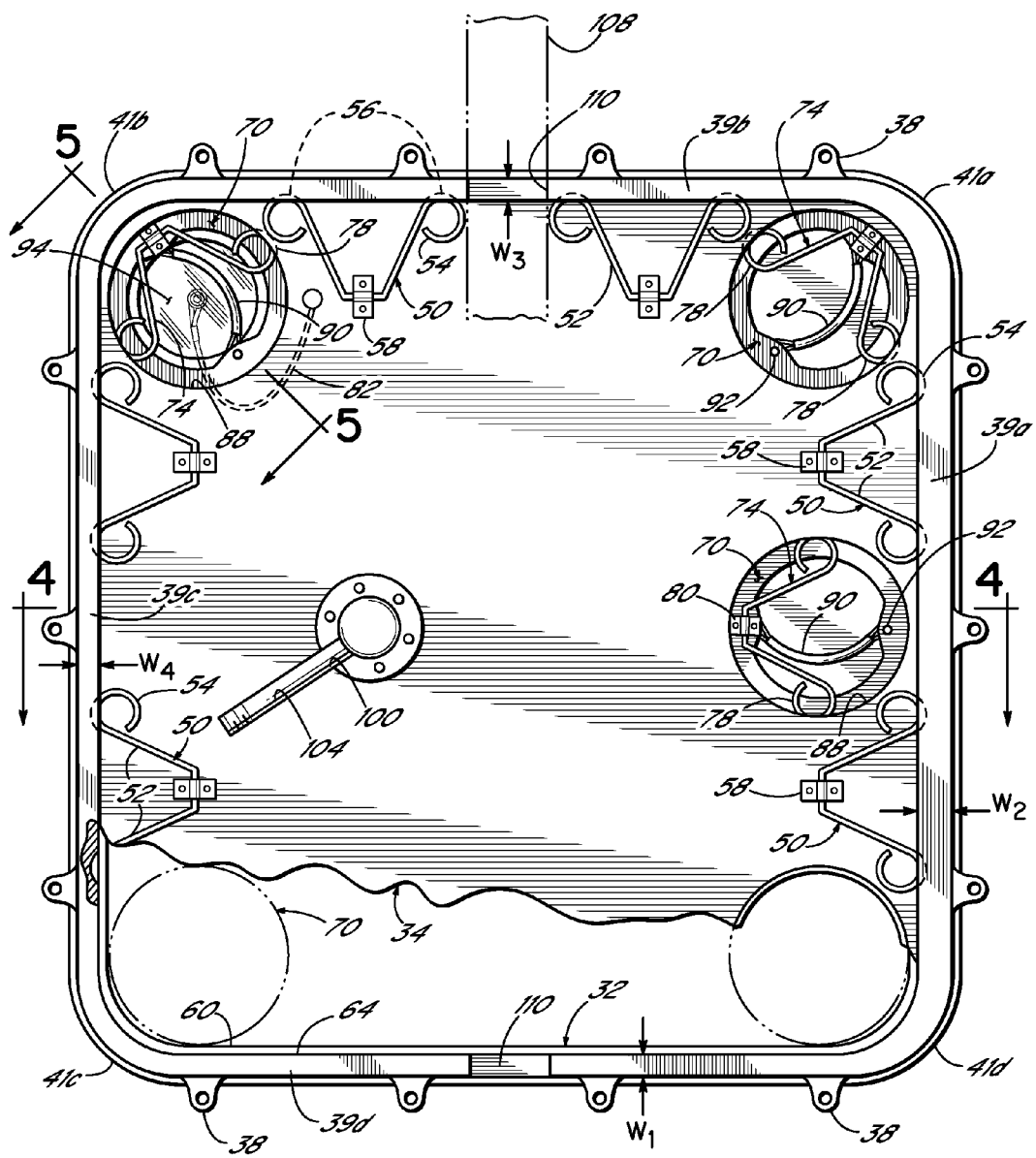
Figure 4:
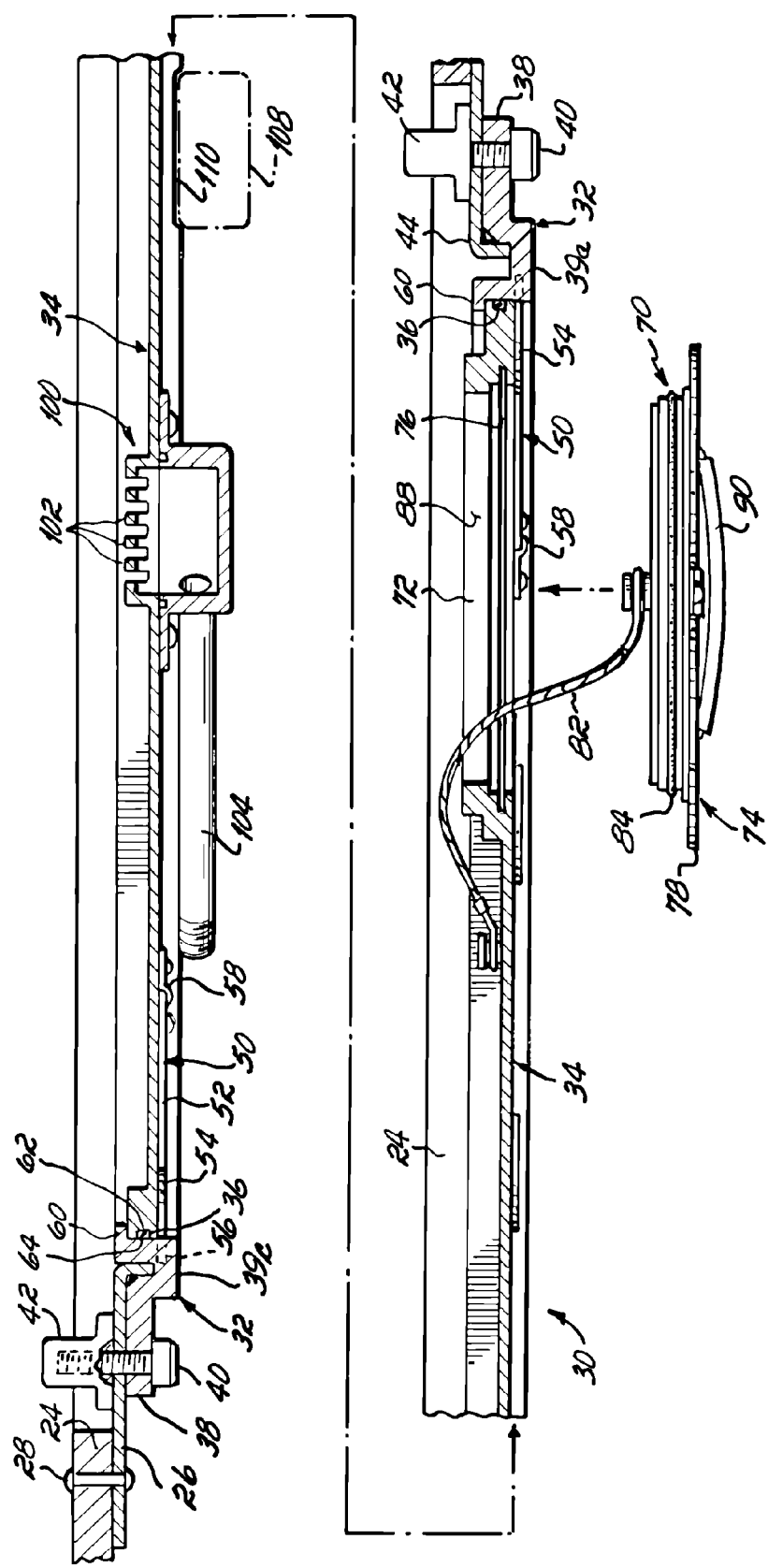

As shown in FIG. 4, seal member 36 was disposed in an outwardly-facing groove 62 which extended around the outer periphery of drip pan 34. In that application, the term "outwardly-facing" represents a direction substantially parallel to the plane of the drip pan 34 and extending away from the drip pan 34. As illustrated in FIG. 2, the outer periphery of drip pan 34, which had four straight edges or sides 35a, 35b, 35c, 35d connected by curved portions 37a, 37b, 37c, 37d, conformed to frame member 32 which was comprised of four straight sides or rails 39a, 39b, 39c, 39d connected by curved portions 41a, 41b, 41c, 41d (shown in FIG. 3). With reference to FIGS. 5 and 6, when drip pan 34 was installed into frame member 32, seal member 36 sealingly engaged inwardly-facing surface 64 of frame member 32 to achieve a fluid tight sealing arrangement between drip pan 34 and the frame member 32. In this application, the term "inwardly-facing" represented a direction substantially parallel to the plane of the frame member 32 and extending toward the interior of the frame member 32 and the pan 34. Unexpectedly, seal member 36 provided the necessary sealing engagement between outwardly-facing seal member 36 and inwardly-facing surface 64 despite the fact that groove 62 and surface 64 respectively ran along straight sides 35a, 35b, 35c, 35d and 39a, 39b, 39c, 39d. Typically, peripheral o-ring seals were used in cooperation with annular or curved sealing surfaces such as those defined by curved portions 37a, 37b, 37c, 37d and 41a, 41b, 41c, 41d (shown best in FIGS. 2 and 3). It was previously felt that peripheral seals used along straight sealing surfaces would provide unacceptable sealing integrity.

In one prior drip pan design, a seal was located in a groove opening extending in a direction perpendicular to the plane of the drip pan. The seal would engage a surface which was parallel to the plane of the dip pan. With this arrangement, flexure of the helicopter frame associated with structural opening 24 may breach the seal integrity between the drip pan and the attachment frame causing fluid to leak into the helicopter cabin. Seal member 36 of these FIGS. 2-6, however, was a peripheral seal located in outwardly-facing groove 62 to form a fluid seal between the periphery of the drip pan 34 and the inwardly-facing surface 64 of frame member 32. With this arrangement, flexure of the helicopter frame associated with structural opening 24 did not breach the integrity of the sealing arrangement between the drip pan 34 and the frame member 32. While the sealing member 36 could be any suitable cross-sectional geometry, seal member 36 was preferably an O-ring.

Routine maintenance and inspection of the rotor transmission 16, does not ordinarily require removal of the entire drip pan 34. As shown in FIG. 2, to accommodate limited access for routine maintenance or inspection, or filter replacement, a plurality of small, removable access port covers 70 were provided in drip pan 34 to allow access through access openings or ports 72 to mechanical linkages in and around the rotor transmission and to allow inspection of the fluid levels associated with the rotor transmission 16. An access cover 70 for each access opening 72 was removably disposed in sealing engagement covering the access opening 72. To secure access cover 70 to the access opening 72 in drip pan 34, each access cover 70 had a resilient member 74 which functioned much like resilient member 54 which secured the drip pan 34 to the frame member 32.

With reference particularly to FIGS. 5 and 6, access opening 72 had an annular groove 76 for resiliently receiving curved portion 78 of resilient member 74 to sealingly secure access cover 70 to access opening 72. Advantageously, no tools were required to operate the resilient members 74 to install or remove the access covers 70. In addition, brackets 80 permanently secured resilient member 74 to access covers 70 so resilient members 74 could not be lost or misplaced. Each access cover 70 was attached to the drip pan 32 by a suitable attachment device such as a cable or chain 82 so when an inspection procedure was complete the access cover 70 was readily retrieved and positioned into access opening 72. Each access cover 70 included a seal member 84 disposed in an annular groove 86 extending around the outer periphery of access cover 70. When access cover 70 was placed into access opening 72, seal member 84 sealing engaged surface 88 of drip pan 34 which formed part of access opening 72. Like seal member 36, seal member 84 formed a peripheral seal between the access cover 70 and the surface 88. This arrangement improved on prior sealing arrangements which located the seal member between an access cover surface parallel to but outside of the plane of the access cover 70 and the drip pan 32, i.e., a face seal. As discussed above, the peripheral seal arrangement provided improved seal integrity even if the drip pan 34 flexed. Preferably, seal member 84 was an O-ring.

To facilitate the removal of accessing covers 70 from access openings 72, pull handles 90 were attached to access covers 70. Fasteners 92 fixedly secured pull handles 90 to access covers 70. Preferably, pull handles 90 were cable or chain.

During the preflight procedure of a helicopter, critical filters must be checked and determined operational before the helicopter is allowed to fly. To facilitate this inspection process, at least one of the access or port covers 70 had a transparent cover member 94 (FIG. 5) so that a bypass button or valve associated with a particular filter could be checked visually through the access cover 70 without physically removing the access cover 70 from the access opening or port 72. A seal member 96 was disposed between the transparent cover member 94 and access cover 70 to prevent fluid leakage therebetween. Preferably, the transparent cover member 94 was made from acrylic such as Plexiglass™.

With reference to FIGS. 2-4, drip pan 34 had a drain hole 100 to drain fluid collected by the drip pan 34. Drain hole 100 included strainer members 102 (shown in FIG. 4) to keep foreign objects coming to rest on the drip pan 34 from clogging the drain hole 100. A drain tube 104 was attached to the drain hole 100 to direct the collected fluid to a catch basin (not shown) or to the exterior of the helicopter. The drain tube 104 was made preferably from metal tubing having a diameter of about 0.625 inches. Alternatively, a removable stopper could have been used with drain hole 100 for selective drainage.

In at least one application, as depicted in FIGS. 3 and 4, the drip pan apparatus 30 could have been used on helicopters having carrousel bars added to the interior of the helicopter cabin 12 (shown in FIG. 1) to support, for example, litters used for transporting patients in need of medical attention. Typically, at least one carrousel bar passed directly under the drip pan apparatus 34. To accommodate a carrousel bar 108 (phantom), elongated recesses 110 were provided in frame member 32 so that the frame member 32 did not interfere with the installation and operation of the carrousel bar 108.

In still another application, the drip pan apparatus 30, and more specifically the frame member 32, could have interfered with access to an oil filter associated with the rotor transmission 16 when the drip pan apparatus 30 is installed. To provide for removal of an oil filter 112 (FIG. 6) from the rotor transmission 16, a portion of frame member 32 was machined away as shown by numeral 114 so that the oil filter 112 could be removed along a line not perpendicular to the drip pan apparatus 30. During the removal or installation of oil filter 112, the drip pan 34 was removed to provide even greater access to the oil filter 112. Frame member 34 was machined just enough to permit removal of oil filter 112, and maintain sealing engagement between seal member 36 and surface 64 of frame member 34.

To provide further access to the oil filter 112, the geometry of frame member 32 could be modified. More specifically and with reference to FIG. 3, frame member 32 was comprised of four straight sides or rails 39a, 39b, 39c, 39d connected by curved portions 41a, 41b, 41c, 41d, where each rail 39a, 39b, 39c, 39d had a respective width indicated by $W_1$, $W_2$, $W_3$, $W_4$. To provide improved access to the oil filter 112 (shown in FIG. 6), the opening defined by rails 39a, 39b, 39c, 39d was shifted to the left in FIG. 3 such that the respective widths $W_1$, $W_2$, $W_3$, $W_4$ of rails 39a, 39b, 39c, 39d were not all equal to one another. Preferably, the difference between $W_2$ and $W_4$ was about one quarter of an inch. This transverse shift of the opening helped to accommodate removal of the oil filter 112 which was generally located in the compartment above the drip pan apparatus 30 near the upper left hand corner of the drip pan apparatus 30 shown in FIG. 3.

Accordingly, the prior art disclosed above provided an improved cover and seal for the interior access opening of a helicopter such as the prior BLACK HAWK® helicopter models. As such, that drip pan apparatus sealed against fluid passage from the engine or transmission compartment to the cabin section of a prior model BLACK HAWK® helicopter. In addition, that drip pan apparatus permitted quick access to the engine or transmission compartment of that helicopter, without requiring modification to the existing aircraft structure.

The new invention described below provides the same features and advantages in a model "M" BLACK HAWK® helicopter, but also accommodates the new relieved skirt version of the new "M" model, providing more direct filter access, while still providing the desirable seal functions noted above.

DETAILED DESCRIPTION OF INVENTION

Embodiments of the invention described herein differ from that prior art of U.S. Pat. No. 6,446,907 (the '907 patent) in the structure of the elements defining the asymmetric corner components of a drip pan apparatus 200 shown in FIGS. 7-12. In other aspects, such as in materials of construction and function, in one embodiment, the drip pan apparatus 200 of this invention is like that described in said patent. Accordingly, any item numbers found in FIGS. 7-12 which are the same as those in FIGS. 2-6 designate like components. Moreover, the helicopter 10 of FIG. 1 is similar in outward appearance to the "M" model BLACK HAWK® helicopter and for that reason is used herein to illustrate an overall helicopter environment in which the new drip pan apparatus 200 of FIGS. 7-12 is used.

Turning to FIG. 1, there is shown therein a helicopter 10 representing generally for this invention a BLACK HAWK® Model "M" helicopter of the type made by the Sikorsky Aircraft Company of Stratford, Conn., and other helicopter air frames similar thereto. Like the prior BLACK HAWK® helicopter, the BLACK HAWK® "M" model helicopter has a cabin 12 and an engine or turbine 14 which powers a rotor transmission 16. Shaft 18 transmits rotary motion to a rotor 20 while the transmission 16 is also connected by a drive element (not shown) to tail rotor 22. Like the BLACK HAWK® helicopter, the BLACK HAWK® Model "M" helicopter has a fixed transmission access opening but designated 205 in FIG. 1. The "M" model embodies a variety of other differences from the prior BLACK HAWK® helicopter of FIG. 1 of the '907 patent but in ways not relevant to this invention except as further described.

Figure 7:
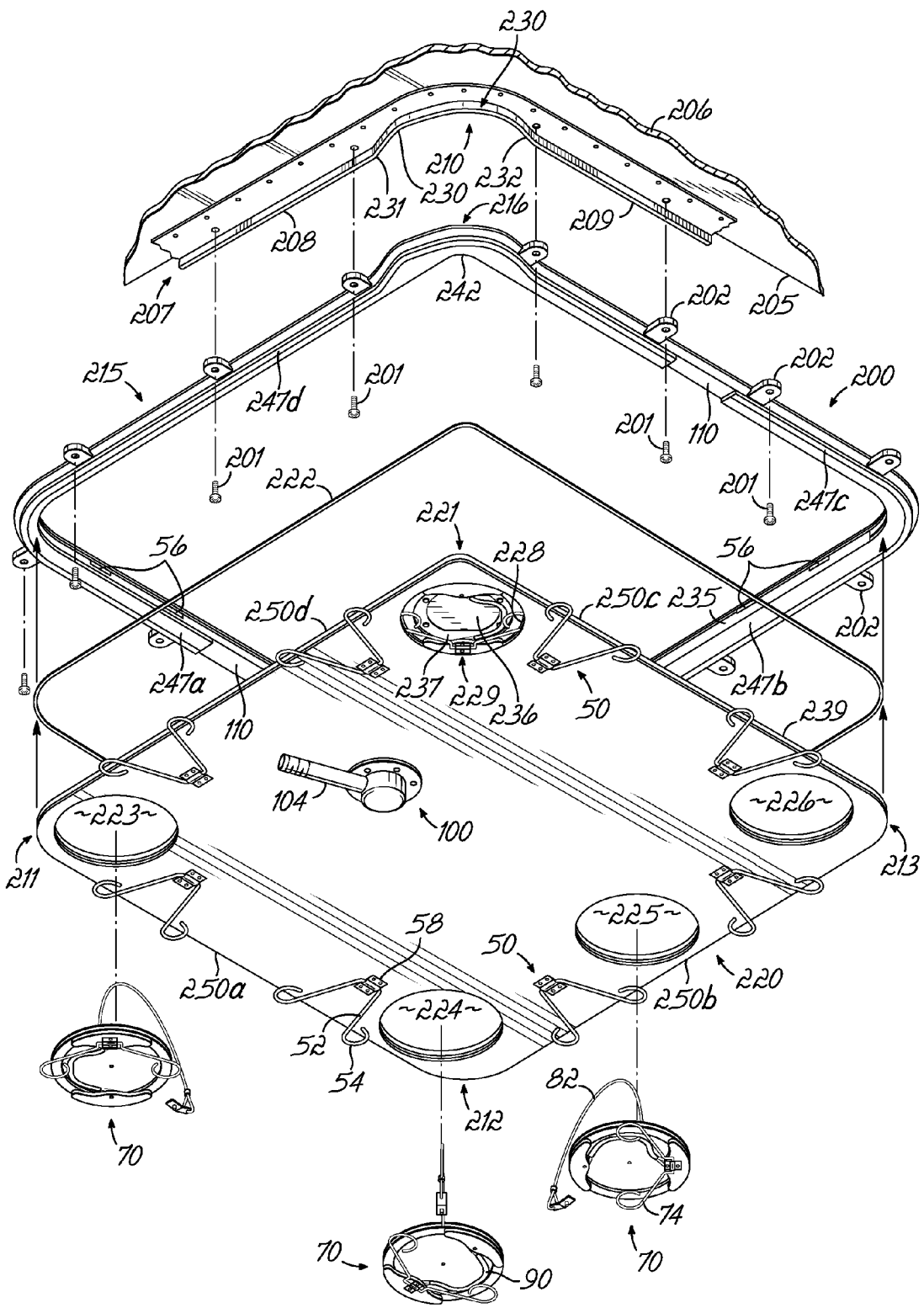
FIG. 7 is an exploded isometric view of components of the new drip pan apparatus according to one embodiment of the invention.

Turning now to FIG. 7, the drip pan apparatus 200 has application for use in a "M" model BLACK HAWK® helicopter and other similar airframes having the fixed transmission access opening 205 defined by an air frame member 206 and a depending flexible skirt 207 attached thereto. Skirt 207, like skirt 26 of FIG. 2, is many times more flexible than air frame member 206 to which skirt 207 is attached. Skirt 207 of the BLACK HAWK® Model "M" helicopter has two straight portions 208, 209 and an expanded corner 210 therebetween, as well as a remaining periphery defined by straight sections and corners. Note that skirt 207, between straight portions 208, 209, forms two inwardly-facing convex curves 231, 232 and an inwardly-facing concave curve 230. The concave curve 230 is oriented inwardly at the corner 210 so that straight portions 208, 209 flow into the curves 231, 232 which are tangent to, or flow into, curve 230. It will be appreciated that an extension of each straight portion 208, 209 would intersect an extension of curve 230 at an angle greater than zero degrees. In this manner, the corner 210 of skirt 207 has been expanded outwardly of the location of the same corner of the prior skirt of the '907 patent.

In one embodiment of this invention, corner 210 is asymmetric to the other corners (not shown) of the skirt 207, which other corners may remain in the same configuration. In other words, the corner 210 is defined by a shape that is different than the other corners of the skirt 207. By contrast, in the access opening covered by the prior drip pans of the '907 patent all four corners of the prior skirt were symmetrical. As is described below, the drip pan apparatus 200 sealingly cooperates with the skirt 207, including the corner 210, to cover access opening 205 to prevent fluid drippings from entering the cabin 12 of the Model "M" BLACK HAWK® helicopter 10.

To that end, and with continued reference to FIG. 7, the drip pan apparatus 200 includes a frame 215 having a corner structure 216, a drip pan 220 having a new corner 221, and an o-ring seal 222. In use, the frame 215 is secured to air frame member 206. As shown, rivets 201 or other fasteners may secure the frame 215 to the skirt 207 and air frame 206 through tabs 202. A flexible sealing media (not shown), such as PROSEAL™ (manufactured by PRC Desoto International, Inc. of Indianapolis, Ind., a PPG Company) or other sealant may be used to seal the frame 215 to skirt 207 when the frame 215 is secured to the air frame 206.

Figure 8:
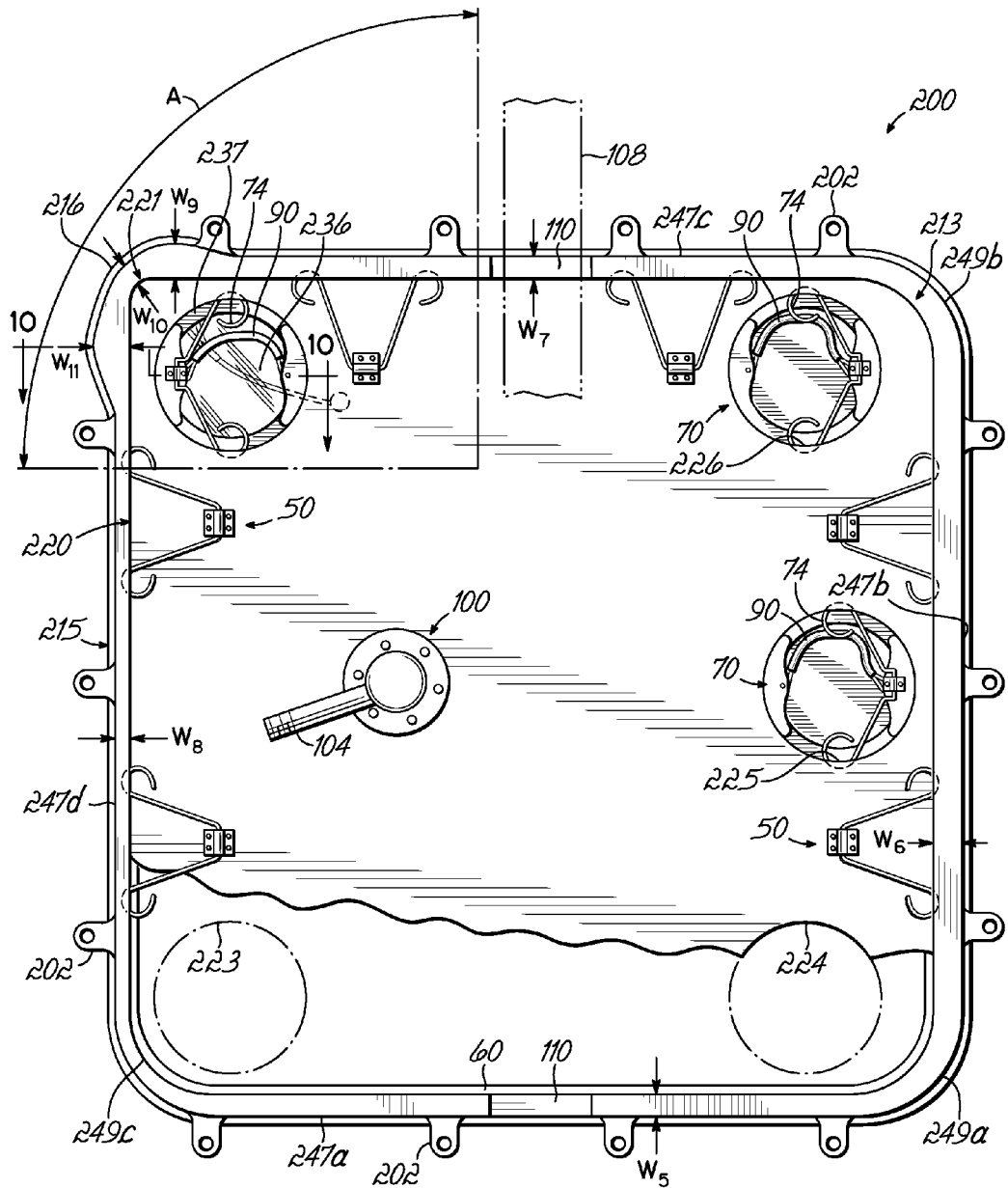
FIG. 8 is a plan view of the drip pan of FIG. 7 as will be viewed from the cabin section of a helicopter when in use.

Thereafter, drip pan 220 is inserted into the frame 215 in the position illustrated in FIGS. 7 and 8, where seal member or o-ring 222 creates a peripheral seal between the drip pan 220 and frame 215 and provides continuous sealing during air frame flexure and without the disadvantage of any face seal in this regard. Attachment members 50 releasably secure the drip pan 220 to the frame 215 similarly to the prior pan of the '907 patent where elongated arm 52 with curved portions 54 selectively engage slots 56. Once the pan 220 is inserted into the frame 215, a drain line 104 may be connected to pass drainage fluids from drain 100.

As set forth above, and with continued reference to FIG. 7, the frame 215 accommodates the outward expansion of the skirt 207 at corner 210. In particular, as is described in more detail below, corner structure 216 of frame 215 has been expanded outwardly to match the outward expansion of the skirt 207, as shown. In addition, the radius of the inwardly-facing frame corner represented at 242 has been significantly reduced to correspond to a relatively small radius of corner 221 of drip pan 220.

With reference to FIGS. 7 and 8, the frame 215 comprises four straight sides or rails 247a, 247b, 247c, 247d connected by curved portions 249a and 249b, the corner structure 216, and curved portion 249c, respectively. The rails 247a, 247b, 247c, 247d; the curved portions 249a, 249b, 249c; and the corner structure 216 collectively define the inwardly-facing peripheral surface 235 (shown in FIG. 7). Each rail 247a, 247b, 247c, 247d has a respective width indicated by $W_5$, $W_6$, $W_7$, $W_8$ (labeled in FIG. 8) measured from the inwardly-facing peripheral surface 235 to an outer periphery of the frame 215.

In one embodiment and with reference to FIG. 7, the width of the corner structure 216 varies to accommodate the expansion of the skirt 207, specifically the curve 230, at corner 210. The variation in the width of the corner structure 216 is shown in FIGS. 8 and 9A. As shown, the width of the corner structure 216 transitions from the width $W_7$ of rail 247c to width $W_8$ of rail 247d. In one embodiment, at least a portion of the corner structure 216 is wider than either adjacent rail 247c or rail 247d. Specifically, the width of the corner structure 216 at one location, for example at width $W_9$ or width $W_{11}$ may be greater than either width $W_7$ or width $W_8$. By way of further example, as depicted in FIGS. 8 and 9A, the width of corner structure 216 may transition from width $W_7$ to width $W_9$ that is greater than width $W_7$. The width of the corner structure 216 then decreases from width $W_9$ into an inwardly-facing frame corner 242 or width $W_{10}$ that is less than the width $W_9$. Further, the width of the corner structure 216 then increases to width $W_{11}$ before transitioning to a narrower width $W_8$ of rail 247d. It will be appreciated that the width of the corner structure 216 may vary smoothly from $W_7$ to $W_8$.

Furthermore, to provide improved access to the filter F (shown in FIG. 11), the opening defined by rails 247a, 247b, 247c, 247d may be shifted to the left in FIG. 8 such that the respective width $W_6$ and width $W_8$ of rails 247b and 247d are not equal to one another. This transverse shift of the opening helps to accommodate removal of the filter which is generally located in the compartment above the drip pan apparatus 200. It will be appreciated that widths $W_5$, $W_6$, $W_7$, $W_8$ may not be equal to any of the widths $W_1$, $W_2$, $W_3$, $W_4$ of FIG. 3.

With regard to the pan 220 and with further reference to FIG. 7, the pan 220 has an outwardly-facing peripheral surface 239, which has four straight sides 250a, 250b, 250c, 250d connected by corners 211, 212, 213, and corner 221. The outwardly-facing peripheral surface 239 conforms to the inwardly-facing peripheral surface 235. As set forth above, the radius of the corner 242 is significantly reduced to correspond to the radius of the corner 221 of the pan 220. As shown in FIGS. 7 and 8, the corner 221 is developed about a much smaller radius than its other pan corners 211-213. It will be appreciated that the variation of the radius configuration of the corner 221 from the corners 211-213 simplifies installation of the pan 220 by preventing incorrect installation since the pan 220 may be inserted into the frame 215 in only one orientation.

Additionally, in one embodiment, the drip pan 220 defines a plurality of access ports 223-226 and a filter access port 228, which is provided with a removable port cover 229 having a view window 236 and frame 237. Once the drip pan 220 is secured to the frame 215, the status of a filter or other component in or on the transmission may be viewed through the view window 236. Also, any one or more of the access covers 70 may be removed from its respective access port 223-226 such that routine maintenance and inspection of components within access opening 205 may be performed. In one embodiment, the drip pan apparatus 200 differs from that pan apparatus of the prior '907 patent only in the area A as identified in FIG. 8.

Figure 9:
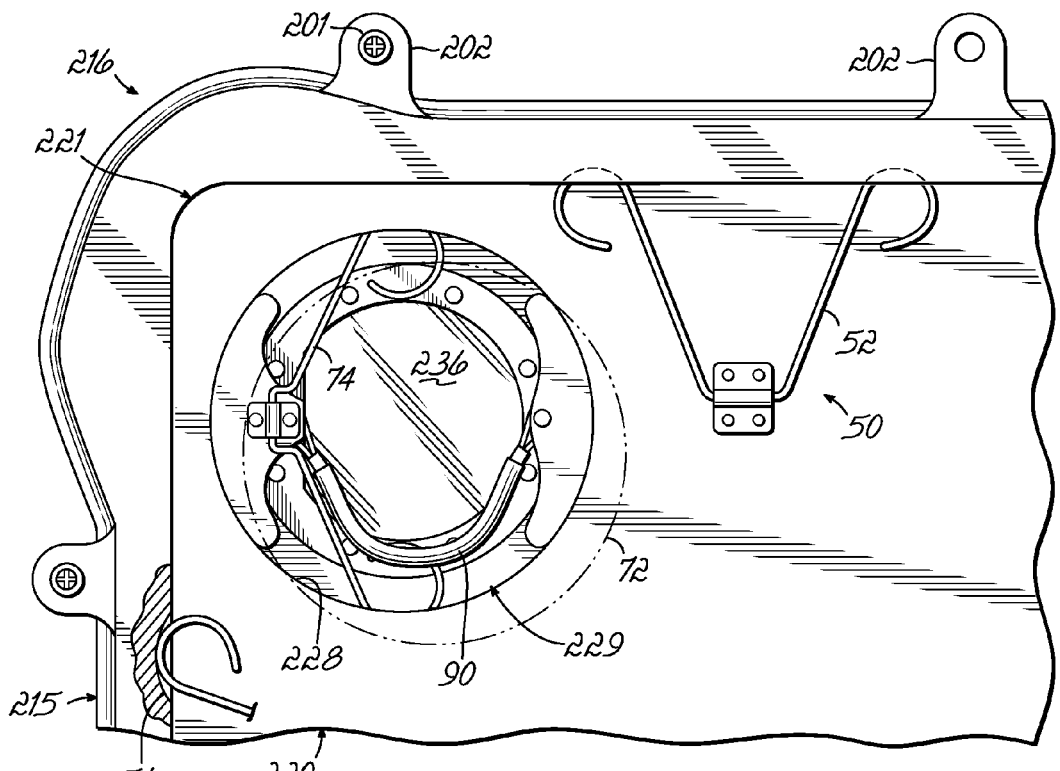
FIG. 9 is an enlarged view of the new corner structure according to one embodiment of the invention in the upper left-hand corner of FIG. 8 but illustrating the prior art access port in phantom for comparison.
Figure 9A:
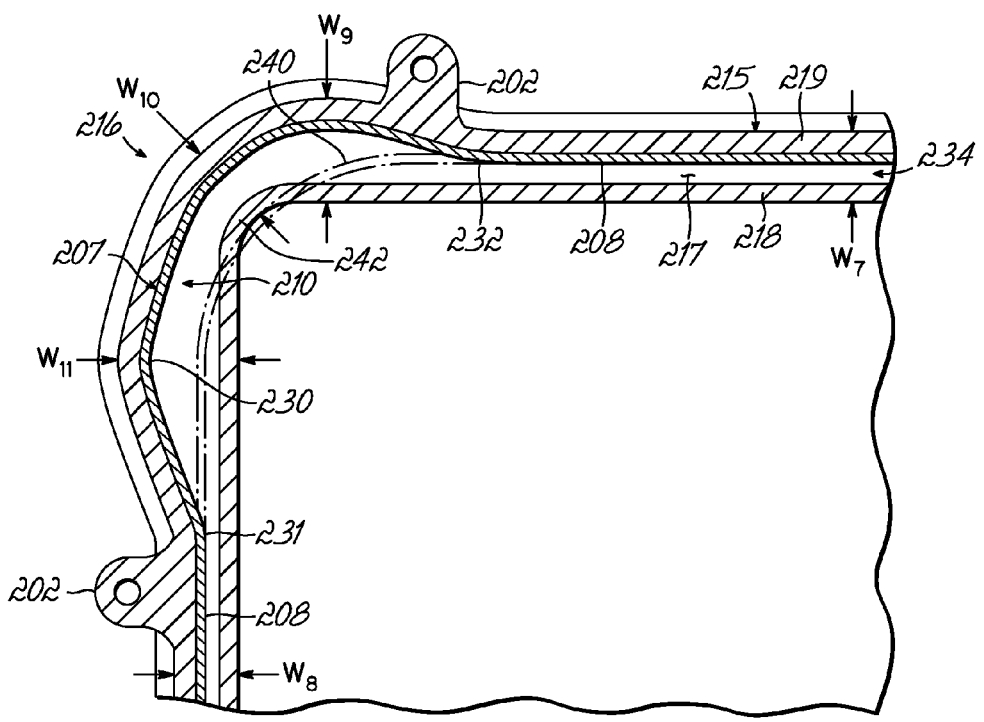
FIG. 9A is a cross-sectional view of the corner structure in FIG. 9, but illustrating the prior art skirt in phantom for comparison.
Figure 9B:
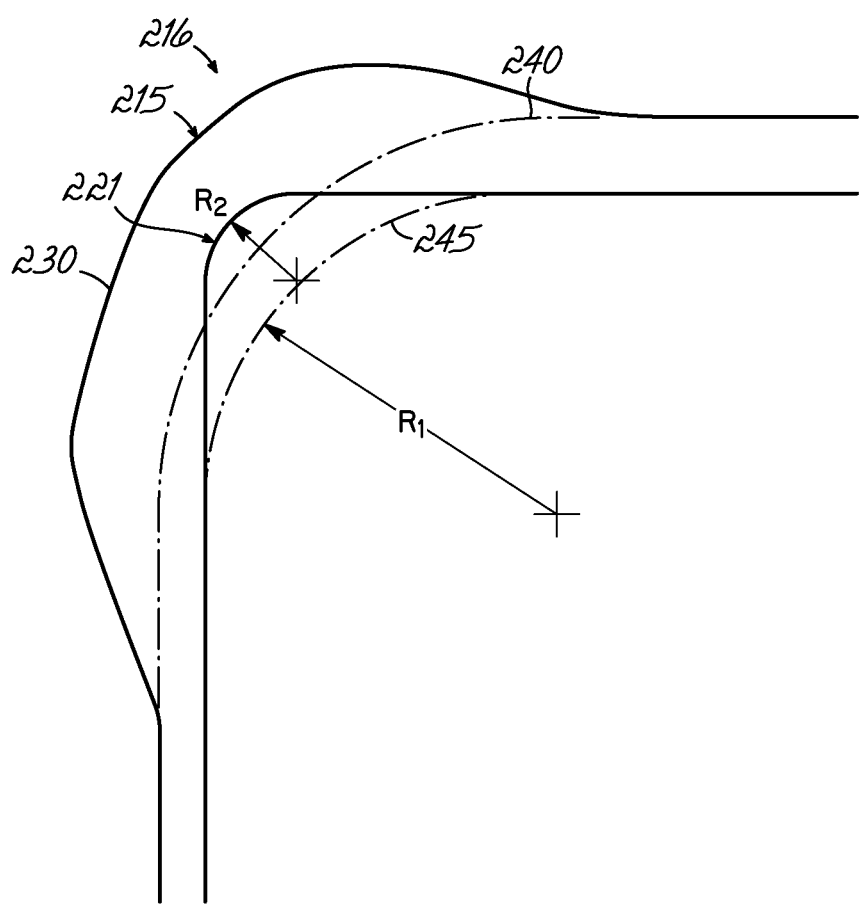
FIG. 9B graphically illustrates the new frame of the apparatus contrasted with the old skirt and old pan corner orientation.

FIGS. 9, 9A, and 9B illustrate area A of FIG. 8 in greater detail. As shown in FIG. 9, the extra material provided by expansion of the pan 220 out to the smaller radius corner 221 allows port 228 to be moved out toward the corner 221 and more directly under (when in use) a filter compared to the prior art port 72 (shown in phantom line). Thus positioned, the port 228 provides improved visual access to components on the transmission, such as the filter, and any indicator or "bypass button" thereon, indicating the operational status thereof. In other words, the indicator or button can be more easily viewed through filter access port 228 from more widely varied viewing positions than in the prior drip pan configuration.

Similarly, with respect to the prior art skirt and the new skirt 207, the prior skirt is identified in phantom lines at 240 in FIG. 9A. In one embodiment of this invention, as described above, the new skirt 207 is expanded outwardly as shown in the solid lines at this corner to form 242. The smaller radius corner 242 corresponds to small radius corner 221 of the pan 220, shown in FIG. 9. FIG. 9B graphically illustrates the comparison of the new frame 215 and the respective orientations of the old skirt 26 designated 240 and the old prior art pan corner 245 (both shown in phantom line).

With continued reference to FIG. 9B, in one embodiment, radius $R_1$ of the prior art pan corner 245 may be of greater length than the radius $R_2$ of corner 221 in the drip pan apparatus 200, thereby allowing the filter access port 228 to be moved more directly in line with a filter. However, even though the radius of corner 221 is smaller, as shown in FIG. 7, the o-ring seal 222 situated between the outwardly-facing peripheral surface 239 and the inwardly-facing peripheral surface 235 unexpectedly seals the drip pan apparatus 200 and prevents egress of fluids from access opening 205.

Figure 10:
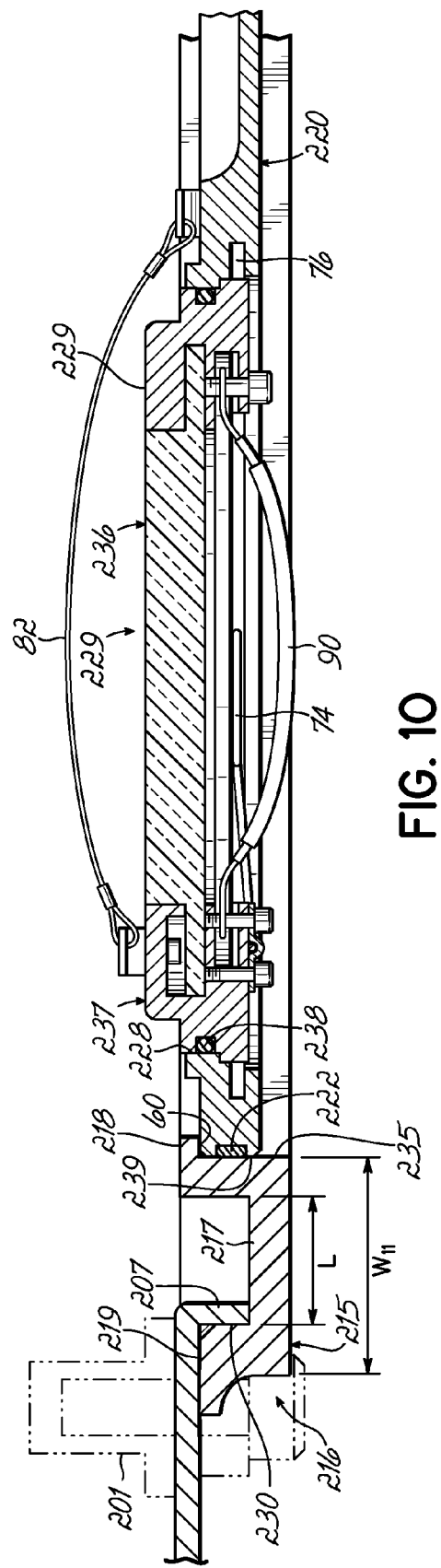
FIG. 10 is a cross-sectional view taken along lines 10-10 of FIG. 8.
Figure 11:
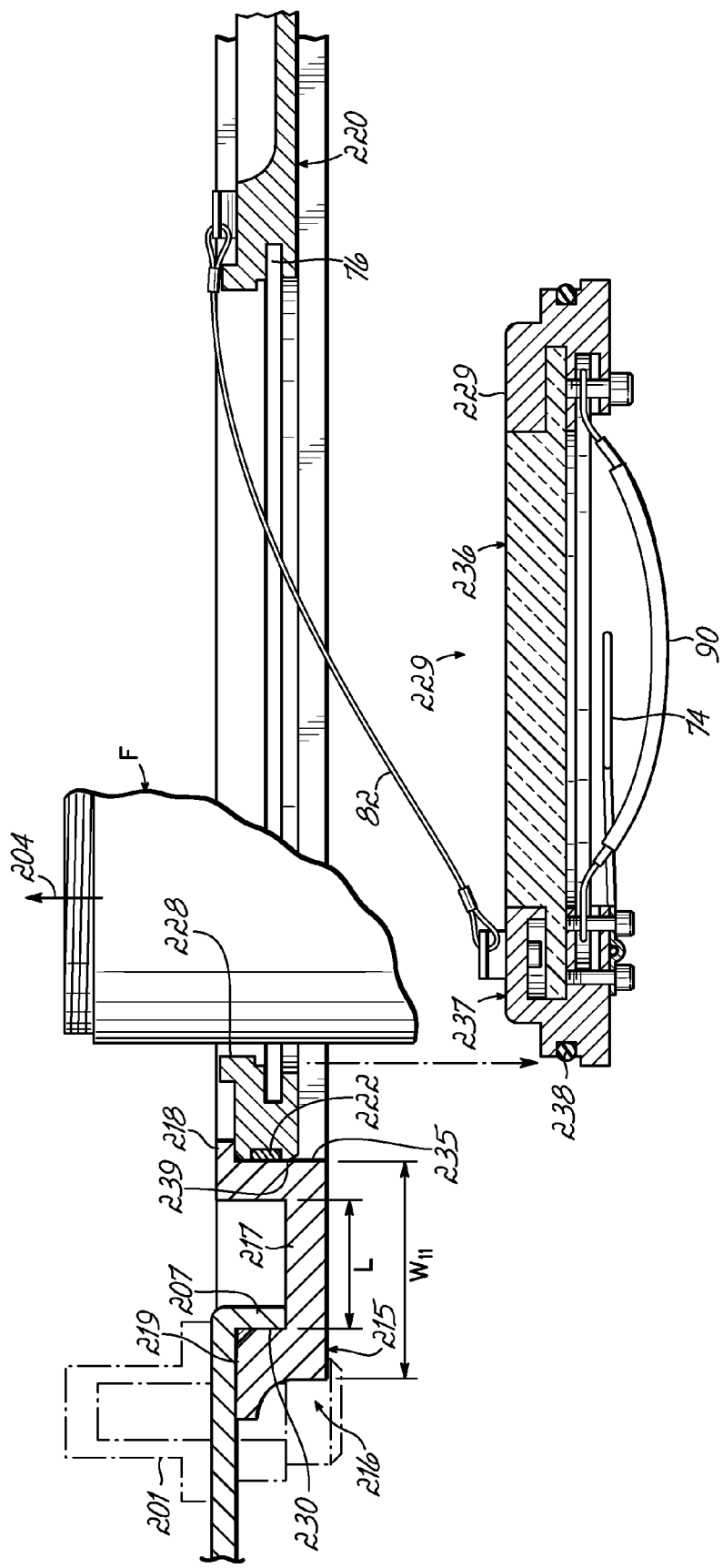
FIG. 11 is an exploded cross-sectional view similar to FIG. 10 but showing the port cover removed and illustrating the replacement of a filter through the port.

With reference now to FIGS. 9A, 10, and 11, in order for the frame 215 to cooperate with the skirt 207 and form a small radius at the corner 242 (shown in FIG. 7), the frame 215 may include an inner rim 218 and an outer rim 219 forming a trough 234 having a floor at 217 therebetween. Preferably, the rim 218 at corner structure 216 is at least partially expanded outwardly from its position in the prior pan to accommodate skirt 207 and form the corner 242. Accordingly, trough 234 may vary in width "L" such that the width of corner structure 216 varies, as described above, as required about frame 215 to accommodate the concave curve 230 (shown in FIG. 7).

Furthermore, this corner structure at 216 will be appreciated by contrasting prior art FIGS. 5 and 6 with new FIGS. 10 and 11. In FIGS. 10 and 11, the frame 215 has been expanded at 217 to the length "L". In prior FIGS. 5 and 6, the frame was not so expanded. Thus, skirt 207 (at concave curve 230) has been moved significantly to the left as viewed in FIGS. 10 and 11 as compared to the prior frame. According to embodiments disclosed herein, a filter F (FIG. 11) can advantageously be removed or inserted in a direction along and parallel to an elongated filter axis 204 when the removable port cover 229 is removed from the pan 220.

If desired, in one embodiment, a trim ring (not shown) can be applied to aesthetically cover the frame 215, leaving only drip pan 220 and the ports 223-226, 228 clear for use or for overall removal of the drip pan 220 for access to the transmission 16.

Moreover, and if desired, while o-ring 222 is shown in a simple, outwardly facing, parallel sided groove, other groove shapes capturing the o-ring 222 to the drip pan 220 (or alternatively to frame 215) may be used. It will also be appreciated that the scale of the figures such as in FIGS. 10 and 11 may be changed, such that o-ring 222 is actually in more of an oval or circular cross-section, or more of a squared configuration than as shown in these figures, and more like, for example, the cross-sectional configuration of peripheral seal 238 in FIGS. 10 and 11.

Figure 12:
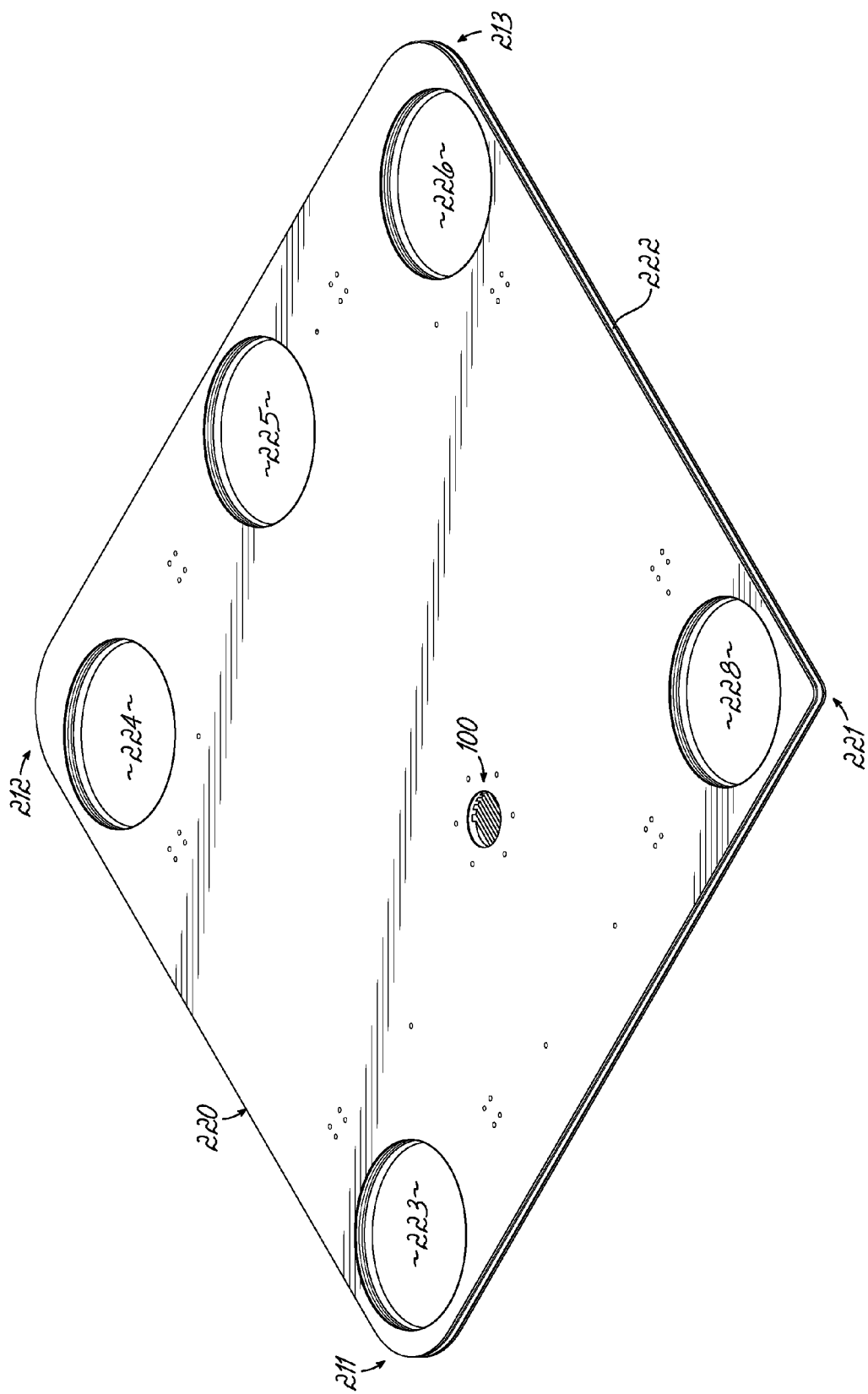
FIG. 12 is an isometric view of the new drip pan (with port covers not shown for clarity) from the perspective of the transmission side of the new drip pan when in use.

With reference to FIGS. 7 and 12, while the corners of the frame 215 and the pan 220 are drawn and referenced as being defined by radii, one skilled will appreciate that other shaped corners may be utilized. Even so, the corner 221 and the corner 242 are cooperatively shaped. The remaining corners of the pan 211-213 cooperate with their respective other corners (unlabeled) of the frame 215. The shape at the corner 221 is, however, different than the shape of the corners at 211-213. Thus, the pan 220 may be inserted into the frame 215 in only one orientation.

The drip pan 220 otherwise performs the same sealing and access functions for the "M" Model as in the prior BLACK HAWK® helicopter without requiring air frame modifications and without utilizing face seals to seal any of the ports 223-226 and 228 or to form the seal between the drip pan 220 and the frame 215.

While the present invention has been illustrated by the description of embodiments thereof, and while the embodiments have been described in considerable detail, they are not intended to restrict or in any way limit the scope of the appended claims to such detail. Additional advantages and modifications will readily appear to those skilled in the art. The invention in its broader aspects is therefore not limited to the specific details and drawings shown and described. Accordingly, departures may be made from such details without departing from the scope of the general inventive concept.

What is claimed is:

1. A drip pan for cooperation with a frame secured to a depending skirt, which defines an access opening for access to a rotor transmission of a helicopter, the frame having an inwardly-facing peripheral surface, said drip pan comprising:
a member having an outwardly-facing peripheral surface, said outwardly-facing peripheral surface being adapted to cooperate with the inwardly-facing peripheral surface of the frame and defining a first pan corner and at least one other pan corner, wherein said first pan corner differs in curvature to said at least one other pan corner.

2. The drip pan of claim 1 wherein said member is removably received within the frame in a single orientation.

3. The drip pan of claim 1 wherein said first pan corner is defined by a first pan corner radius and said at least one other pan corner is defined by a pan corner radius that is larger than said first pan corner radius.

4. The drip pan of claim 1 wherein said outwardly-facing peripheral surface defines a second pan corner having a second pan corner radius and a third pan corner having a third pan corner radius, said second pan corner radius being substantially the same as said third pan corner radius.

5. The drip pan of claim 1 wherein an oil filter is attached to the rotor transmission and wherein said member defines an access port for permitting access to the oil filter.

6. A drip pan apparatus for a helicopter having an access opening defined by a depending skirt having at least two straight sides connected by a corner, wherein the corner is defined by an inwardly oriented concave curve such that an extension of the concave curve intersects an extension of at least one straight side at an angle greater than zero degrees, said drip pan apparatus comprising:
a frame configured to cooperate with the skirt, including the inwardly oriented concave curve, said frame comprising:
an inwardly-facing first frame corner defined by a first frame corner radius, and
at least one other inwardly-facing frame corner defined by a frame corner radius that is greater than said first frame corner radius; and
a drip pan for cooperating with said frame, said drip pan comprising:
a first pan corner defined by a first pan corner radius and configured to cooperate with said first frame corner; and
at least one other corner defined by a pan corner radius that is greater than said first pan corner radius, said at least one other pan corner being configured to cooperate with said at least one other inwardly-facing frame corner.

7. The drip pan apparatus as in claim 6 wherein said drip pan has an outwardly-facing peripheral groove extending around said drip pan, including around said first pan corner, and said drip pan apparatus further includes:
an o-ring seal disposed in said outwardly-facing peripheral groove for sealingly engaging said frame.

8. A drip pan apparatus for covering and sealing a helicopter transmission access opening in a helicopter, the drip pan apparatus comprising:
a frame adapted to mount to the helicopter transmission access opening, said frame having an inwardly-facing peripheral surface extending around said frame, said inwardly-facing peripheral surface having a first frame corner defined by a first frame corner shape and at least one other frame corner defined by a frame corner shape that differs from said first frame corner shape;
a drip pan having an outwardly-facing peripheral surface extending around said drip pan, said outwardly-facing peripheral surface having a first pan corner defined by a first pan corner shape and at least one other drip pan corner defined by a drip pan corner shape that differs from said first pan corner shape, wherein said first pan corner cooperates with said first frame corner and said drip pan is configured to be selectively affixed to said frame; and
a seal member operably disposed between said outwardly-facing peripheral surface and said inwardly-facing peripheral surface when said drip pan is affixed to said frame.

9. The drip pan apparatus as in claim 8 wherein said drip pan defines an access port and the drip pan apparatus further comprises:
an access cover removably disposed within said access port.

10. The drip pan apparatus as in claim 9 wherein said access port is disposed proximate a corner that is of a shape different from said other corners.

11. The drip pan apparatus as in claim 9 wherein said access port is positioned in said drip pan to permit visual viewing of an oil filter through said access port.

12. The drip pan apparatus as in claim 9 wherein said access cover has a viewing window to permit visual inspection of an oil filter without removal of said access cover.

13. The drip pan apparatus as in claim 8 wherein said first frame corner shape is defined by a first frame corner radius and said first pan corner is defined by a first pan corner radius.

14. The drip pan apparatus as in claim 8 wherein the drip pan further includes:
- a peripheral groove in said outwardly-facing peripheral surface, including around said first pan corner, and said o-ring seal is disposed within said peripheral groove.

15. In combination:
- a multipassenger helicopter comprising:
  - a flight deck;
  - a cabin section rearwardly of said flight deck;
  - a rotor transmission oriented at least in part above said cabin section; and
  - a transmission access opening within said cabin section for providing access to said rotor transmission; and
- a drip pan apparatus for covering said transmission access opening, said drip pan apparatus comprising:
  - a frame adapted to mount to said transmission access opening,
    - said frame having an inwardly-facing peripheral surface extending around said frame,
    - said inwardly-facing peripheral surface having a first frame corner defined by a first frame corner shape and at least one other frame corner defined by a frame corner shape that is different than said first frame corner shape;
  - a drip pan having an outwardly-facing peripheral surface extending around said drip pan,
    - said outwardly-facing peripheral surface having a first pan corner defined by a first pan corner shape and at least one other drip pan corner defined by a drip pan corner shape that is different than said first pan corner shape,
    - wherein said first pan corner cooperates with said first frame corner and said drip pan is configured to be selectively affixed to said frame; and
  - an o-ring seal disposed between said inwardly-facing peripheral surface and said outwardly-facing peripheral surface.

16. The drip pan apparatus of claim 15 wherein said first frame corner is defined by a first frame corner radius and said at least one other frame corner is defined by a frame corner radius that is greater than said first frame corner radius, and
- said first pan corner is defined by a first pan corner radius and said at least one other pan corner is defined by a pan corner radius that is greater than said first pan corner radius.

17. A method of installing a drip pan apparatus to a helicopter structure where the helicopter has a rotor transmission and a rotor transmission access opening, the drip pan apparatus comprises a frame having an inwardly-facing peripheral surface having a first frame corner defined by a first frame corner radius, at least one other corner defined by a frame corner radius, and a slot formed therein; a drip pan having an outwardly-facing peripheral surface, the outwardly-facing peripheral surface having a first pan corner defined by a first pan corner radius and at least one other pan corner defined by a pan corner radius that is larger than the first pan corner radius, the outwardly-facing peripheral surface having an outwardly-facing peripheral groove; a resilient member attached to the drip pan and adapted to cooperate with the slot; and a seal member disposed within the outwardly-facing peripheral groove, the method comprising:
- securing the frame to the rotor transmission access opening;
- inserting the drip pan into the frame such that the first pan corner aligns with the first frame corner and the seal member sealingly engages the inwardly-facing peripheral surface against fluid leakage therethrough; and
- engaging the slot with the resilient member to detachably secure the drip pan in sealing engagement with the frame.

18. A method of installing a drip pan apparatus to a helicopter structure where the helicopter has a rotor transmission and a rotor transmission access opening, the method comprising:
- securing a frame to the helicopter structure to define the rotor transmission access opening, the frame having an inwardly-facing peripheral surface and a plurality of frame corners each defined by a frame corner radius, at least one frame corner radius being smaller than an adjacent frame corner radius; and
- inserting a drip pan into the frame with a seal member disposed within an outwardly-facing peripheral groove of the drip pan for sealing engagement with the inwardly-facing peripheral surface of the frame,
- wherein inserting further includes orienting the drip pan having a plurality of pan corners, each pan corner having a pan corner radius with a first pan corner radius being smaller than an adjacent pan corner radius, with respect to the frame so as to align the first pan corner with the first frame corner.

19. The method of installing the drip pan apparatus of claim 18 further comprising:
- engaging a slot in the frame with a resilient member secured to the drip pan.

20. A method of installing a drip pan in a helicopter structure where the helicopter structure has a rotor transmission, a rotor transmission access opening, and a frame secured to the helicopter structure that defines the rotor transmission access opening, the method comprising:
- inserting a drip pan into the frame, the drip pan having a plurality of pan corners with a first pan corner having a different shape than an adjacent pan corner, wherein inserting includes aligning the first pan corner with a first frame corner and aligning the remaining pan corners with the remaining frame corners.

21. The method of installing the drip pan of claim 20, wherein the drip pan defines an access port at the first pan corner with an access cover removably disposed within the access port, and inserting the drip pan into the frame covers an oil filter disposed on the rotor transmission, the method further comprising:
- removing the access port to gain access to the oil filter through the access port.

22. A drip pan for cooperation with a frame secured to a depending skirt, which defines an access opening for access to a rotor transmission of a helicopter, the frame having a surface facing the depending skirt and an inwardly-facing peripheral surface of asymmetrical shape disposed substantially perpendicular to the surface facing the depending skirt, wherein said asymmetrical shape of said inwardly-facing peripheral surface of said frame defines a radius of smaller extent than any other radius of any other portion of said inwardly-facing peripheral surface, said drip pan comprising:
- a member having an outwardly-facing peripheral surface of asymmetrical shape operably corresponding to the asymmetrical shape of the inwardly-facing peripheral surface of said frame, and
- a resilient seal disposed between said inwardly-facing peripheral surface and said outwardly-facing peripheral surface, when said member is operably disposed in said frame for sealing said member to said frame, about said peripheral surfaces.

23. The drip pan as in claim 22 wherein said asymmetrical shapes of said frame and said member match when said member is operably disposed in said frame.

24. A drip pan apparatus for a rotor transmission access opening in a helicopter, said drip pan apparatus comprising:
 a drip pan having a peripheral edge for fitting in said opening, said edge defined in part by a plurality of corners, one of which is developed about a radius of smaller extent than the radii of the other corners in said plurality.

25. The drip pan apparatus as in claim 24 wherein said pan has four elongated sides joined at four corners of which three sides have at least one end extending tangentially into one of three corners having a first radius, and two of said four sides extend tangentially into a corner having a second radius smaller than said first radius.

26. A drip pan for cooperation with a frame secured to a depending skirt, which defines an access opening for access to a rotor transmission of a helicopter, the frame having an inwardly-facing peripheral surface of asymmetrical shape, said drip pan comprising:
 a member having an outwardly-facing peripheral surface of asymmetrical shape operably corresponding to the asymmetrical shape of the inwardly-facing peripheral surface of said frame, and
 a resilient seal disposed between said inwardly-facing peripheral surface and said outwardly-facing peripheral surface, when said member is operably disposed in said frame for sealing said member to said frame, about said peripheral surfaces, wherein said asymmetrical shape of said inwardly-facing peripheral surface of said frame defines a radius of smaller extent than any other radius of any other portion of said inwardly-facing peripheral surface.

* * * * *